United States Patent
Marconi et al.

(10) Patent No.: US 10,415,482 B2
(45) Date of Patent: Sep. 17, 2019

(54) TURBOSHAFT ENGINE COMPRISING A CONTROLLED MECHANICAL COUPLING DEVICE, HELICOPTER EQUIPPED WITH SUCH A TURBOSHAFT ENGINE, AND METHOD FOR OPTIMISING THE ZERO-POWER SUPER-IDLE SPEED OF SUCH A HELICOPTER

(71) Applicant: SAFRAN HELICOPTER ENGINES, Bordes (FR)

(72) Inventors: Patrick Marconi, Gelos (FR); Romain Thiriet, Jurancon (FR); Camel Serghine, Boeil-bezing (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 201 days.

(21) Appl. No.: 15/128,375

(22) PCT Filed: Mar. 20, 2015

(86) PCT No.: PCT/FR2015/050701
§ 371 (c)(1),
(2) Date: Sep. 22, 2016

(87) PCT Pub. No.: WO2015/145045
PCT Pub. Date: Oct. 1, 2015

(65) Prior Publication Data
US 2017/0101936 A1    Apr. 13, 2017

(30) Foreign Application Priority Data
Mar. 27, 2014  (FR) ..................... 14 52654

(51) Int. Cl.
*F02C 7/36*    (2006.01)
*F02C 3/10*    (2006.01)
(Continued)

(52) U.S. Cl.
CPC .............. *F02C 7/36* (2013.01); *B64D 27/10* (2013.01); *F02C 3/04* (2013.01); *F02C 3/10* (2013.01);
(Continued)

(58) Field of Classification Search
CPC .... F02C 9/16; F02C 3/10; F02C 3/113; F02C 3/107; F02C 7/268; F02C 7/277; F05D 2270/023; F05D 2270/304
See application file for complete search history.

(56) References Cited

U.S. PATENT DOCUMENTS 3,237,404 A    3/1966  Flanigan et al.
3,660,976 A    5/1972  Canale
(Continued)

FOREIGN PATENT DOCUMENTS

| JP | 2001193475 A | 7/2001 |
|---|---|---|
| WO | WO-2009118298 A1 | 10/2009 |
| WO | WO-2012059671 A2 | 5/2012 |

OTHER PUBLICATIONS

International Search Report with English Language Translation, dated Jul. 7, 2015, PCT Application No. PCT/FR2015/050701.

*Primary Examiner* — Steven M Sutherland
(74) *Attorney, Agent, or Firm* — Womble Bond Dickinson (US) LLP

(57) ABSTRACT

The invention relates to a turboshaft engine comprising a gas generator (5) that is capable of being rotated, and a free turbine (6) that is rotated by the gases of said gas generator, characterized in that it comprises a device (40) for controlled mechanical coupling of said gas generator (5) and said free turbine (6) that is capable of connecting said gas generator (5) and said free turbine (6) mechanically and on demand as soon as the rotational speed of said gas generator (5) reaches a predetermined threshold speed.

11 Claims, 1 Drawing Sheet

Figure 1:
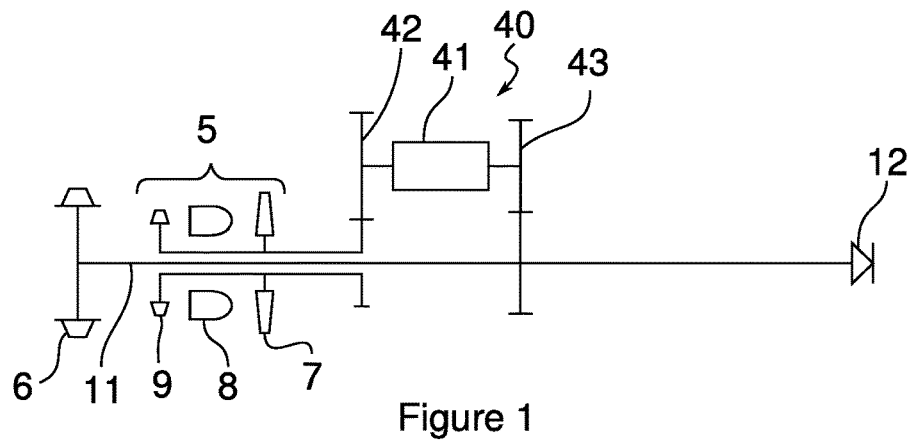

(51) Int. Cl.
  *F02C 3/113* (2006.01)
  *B64D 27/10* (2006.01)
  *F02C 3/04* (2006.01)

(52) U.S. Cl.
  CPC ........ *F02C 3/113* (2013.01); *F05D 2220/329* (2013.01); *F05D 2260/40* (2013.01); *Y02T 50/671* (2013.01)

(56) References Cited

U.S. PATENT DOCUMENTS

| | | | | |
|---|---|---|---|---|
| 3,710,576 | A * | 1/1973 | Evans | F01D 21/006 60/39.163 |
| 3,771,916 | A * | 11/1973 | Flanigan | F02C 3/10 180/301 |
| 4,044,552 | A * | 8/1977 | West | F02C 3/107 60/39.163 |
| 4,064,690 | A * | 12/1977 | Kronogard | F02C 3/103 60/39.163 |
| 2009/0116955 | A1* | 5/2009 | Dauriac | F02C 3/10 415/144 |
| 2012/0159965 | A1* | 6/2012 | Papandreas | F02C 3/10 60/793 |

* cited by examiner

TURBOSHAFT ENGINE COMPRISING A CONTROLLED MECHANICAL COUPLING DEVICE, HELICOPTER EQUIPPED WITH SUCH A TURBOSHAFT ENGINE, AND METHOD FOR OPTIMISING THE ZERO-POWER SUPER-IDLE SPEED OF SUCH A HELICOPTER

1. TECHNICAL FIELD OF THE INVENTION

The invention relates to a turboshaft engine that is intended for equipping a multi-engine helicopter, in particular twin engine helicopter. The invention also relates to a method for optimising the zero-power super-idling mode of a multi-engine helicopter, in particular twin-engine helicopter, of this kind.

2. TECHNOLOGICAL BACKGROUND

A helicopter is generally provided with at least two turboshaft engines which operate at speeds that depend on the flight conditions of the helicopter. Throughout the following text, a helicopter is said to be in a cruise flight situation when it is progressing in normal conditions, in a mode known by the abbreviation AEO (All Engines Operative), during all the flight phases apart from transitional phases of take-off, ascent, landing or hovering flight. Throughout the following text, a helicopter is said to be in a critical flight situation when it is necessary for it to have available the total installed power, i.e. during the transitional phases of take-off, ascent, landing and the mode in which one of the turboshaft engines is malfunctioning, referred to by the abbreviation OEI (One Engine Inoperative).

It is known that, when the helicopter is in a cruise flight situation, the turboshaft engines operate at low power levels, below their maximum continuous power (hereinafter MCP). In some arrangements, the power provided by the turboshaft engines during a cruise flight can be less than 50% of the maximum take-off power (hereinafter MTO). These low power levels result in a specific consumption (hereinafter SC), which is defined as the relationship between the hourly fuel consumption by the combustion chamber of the turboshaft engine and the power provided by said turboshaft engine, of approximately 30% greater than the SC of the MTO, and thus in an overconsumption of fuel during cruise flight.

Finally, during holding phases on the ground, pilots generally prefer to put the various turboshaft engines into idling mode so as to be certain of being able to restart them. The turboshaft engines thus continue to consume fuel, despite not providing any power.

At the same time, the turboshaft engines are also oversized so as to be able to ensure flight over the entire flight range specified by the aircraft manufacturer, and in particular flight at high altitudes and during hot weather. These flight points, which are very restrictive, in particular when the helicopter has a mass that is close to its maximum take-off mass, are only encountered in specific use cases of some helicopters. As a result, although dimensioned so as to be able to provide such powers, some turboshaft engines will never fly in such conditions.

These oversized turboshaft engines are disadvantageous in terms of mass and fuel consumption. In order to reduce this consumption, in all the cases of flight described above (cruise flight, OEI mode, taxiing, hovering flight, or holding on the ground), it is possible to put one of the turboshaft engines into standby mode. The active engine or engines then operate at higher power levels in order to provide all the necessary power, and therefore at more favourable SC levels.

As is known, a turboshaft engine of a helicopter comprises a gas generator and a free turbine which is powered by the gas generator in order to provide power. The gas generator is conventionally made up of air compressors which supply a chamber for combusting the fuel in the compressed air, which compressors deliver hot gases to turbines for partially expanding gas, which turbines rotate the compressors by means of drive shafts. The gases then drive the free power transmission turbine. The free turbine transmits power to the rotor of the helicopter by means of a gearbox.

In FR1151717 and FR1359766, the applicants proposed methods for optimising the specific consumption of the turboshaft engines of a helicopter by the possibility of putting at least one turboshaft engine into a stable flight mode, referred to as continuous flight mode, and at least one turboshaft engine into a particular standby mode that it can leave in an emergency or in a normal manner, according to need. A transition out of standby mode is referred to as 'normal' when a change in the flight situation requires the turboshaft engine in standby to be activated, for example when the helicopter is going to transition from a cruise flight situation to a landing phase. A normal transition out of standby mode of this kind occurs over a period of between 10 seconds and 1 minute. A transition out of standby mode is referred to as 'emergency' when there is a failure or a power deficit in the active engine, or when the flight conditions suddenly become difficult. An emergency transition out of standby mode of this kind occurs over a period of less than 10 seconds.

The applicants have proposed in particular the following two standby modes:
- a standby mode referred to as normal super-idling, in which the combustion chamber is ignited and the shaft of the gas generator rotates at a speed of between 20 and 60% of the nominal speed,
- a standby mode referred to as assisted super-idling, in which the combustion chamber is ignited and the shaft of the gas generator rotates, with mechanical assistance, at a speed of between 20 and 60% of the nominal speed.

A disadvantage of the normal super-idling mode is the operating temperatures, which become increasingly high as attempts are made to reach ever lower idling. However, this has the advantage of minimising the fuel consumption in this mode.

The assisted super-idling mode makes it possible to remedy this problem of operating temperature while further reducing the fuel consumption. However, this requires the use of an electrical, pneumatic or hydraulic drive machine and of a corresponding coupling.

In addition, the technical problem now arises of achieving a super-idling mode which is no longer mechanically assisted and is less limited by the temperatures of the turboshaft engine. The technical problem addressed is therefore that of providing a turboshaft engine that makes it possible to provide an improved super-idling mode of this kind.

3. AIMS OF THE INVENTION

The invention aims to provide a turboshaft engine that can have a super-idling mode, in which the combustion chamber is ignited and the shaft of the gas generator rotates at a speed of between 20 and 60% of the nominal speed, and that is less affected by the operating temperatures of the turboshaft engine and is not mechanically assisted by an external drive device.

The invention therefore aims to provide a turboshaft engine that can have a new super-idling mode.

The invention also aims to provide a twin-engine helicopter comprising at least one turboshaft engine according to the invention.

The invention also aims to provide a method for optimising the zero-power super-idling mode of a twin-engine helicopter according to the invention comprising at least one turboshaft engine according to the invention.

4. DISCLOSURE OF THE INVENTION

In order to achieve this, the invention relates to a turboshaft engine comprising a gas generator that is capable of being rotated, and a free turbine that is rotated by the gases of said gas generator.

A turboshaft engine according to the invention is characterised in that it comprises a device for controlled mechanical coupling of said gas generator and said free turbine, which device is capable of connecting said gas generator and said free turbine mechanically and on demand as soon as the rotational speed of said gas generator reaches a predetermined threshold speed.

A turboshaft engine according to the invention thus makes it possible to connect the gas generator and the free turbine mechanically and on demand. The command for connecting the gas generator and the free turbine depends on the rotational speed of the gas generator. A turboshaft engine according to the invention thus makes it possible to mechanically assist the rotation of the gas generator in a manner that does not need to call on an external drive machine. The power is obtained directly from the free turbine of the turboshaft engine and transmitted by means of the coupling device.

Advantageously and according to the invention, the controlled mechanical coupling device is capable of connecting said gas generator and said free turbine mechanically and on demand as soon as the rotational speed of said gas generator is less than said predetermined threshold speed, and of separating said gas generator and said free turbine on demand as soon as said rotational speed of said gas generator is greater than said predetermined threshold speed.

Thus, according to this aspect of the invention, the controlled coupling device makes it possible to force the free turbine to drive the gas generator when the gas generator is rotating at a speed that is less than a predetermined threshold speed. In other words, a turboshaft engine according to the invention that is equipped with a device for controlled mechanical coupling of the gas generator and the free turbine makes it possible to switch the turboshaft engine, on demand, from a configuration (or mode) referred to as free-turbine, in which the gas generator and the free turbine are mechanically independent, to a configuration (or mode) referred to as connected-turbine, in which the gas generator and the free turbine are mechanically connected.

The predetermined threshold speed is advantageously selected such that it is not possible for the gas generator and the free turbine to be mechanically connected when the turboshaft engine is in super-idling mode, i.e. when the free turbine is no longer producing any torque and is rotating freely at a speed that is less than that at the inlet of the gearbox of the aircraft to which said turbine is connected. By forcing the free turbine to rotate more slowly than its steady-state speed at zero torque, this will thus provide an engine torque that will allow the gas generator to drive the compressor, thus corresponding to a connected-turbine configuration.

A turboshaft engine according to the invention can thus be put into a super-idling mode, during which the free turbine drives the gas generator, making it possible to reduce the temperatures of the hot parts of the turboshaft engine and to reduce the fuel consumption.

Advantageously and according to the invention, the threshold speed depends on a nominal speed of said gas generator.

According to this aspect of the invention, the threshold speed is directly dependent on the nominal speed of the gas generator.

Advantageously and according to this variant, the threshold speed is selected within the range of [20%.N1, 60%.N1], where N1 is said nominal speed of said gas generator.

In other words, a turboshaft engine according to this variant switches from a free-turbine mode to a connected-turbine mode as soon as the rotational speed of the gas generator drops below a threshold value that corresponds to an idling mode (defined here as between 20% and 60% of the nominal speed of the gas generator).

Advantageously and according to the invention, said controlled mechanical coupling device comprises:
- means for reading information that is representative of said rotational speed of said gas generator,
- means for reversible mechanical coupling between a shaft that is mechanically connected to said gas generator and a shaft that is mechanically connected to said free turbine,
- means for controlling said coupling means on the basis of said information that is representative of said rotational speed of said gas generator, and on the basis of said threshold speed.

Advantageously and in a variant, the coupling device further comprises means for authorising said coupling means by way of a command from an engine computer that has previously requested the engine be put into standby mode.

According to this aspect of the invention, reading means make it possible to acquire information that is representative of the rotational speed of the gas generator. Control means make it possible to interpret this information and to compare it with the threshold speed. If the rotational speed is found to be lower than the threshold speed, and if the engine computer has actually previously requested the engine be put into standby mode, a command is sent to coupling means which ensure mechanical coupling between the gas generator and the free turbine, thus switching the turboshaft engine to a connected-turbine mode. This mechanical coupling is achieved by means of intermediate shafts that are mechanically connected to the gas generator and to the free turbine, respectively.

Throughout the text, the term "shaft" denotes a means that is capable of being rotated and of transmitting a torque. It can therefore be a longitudinally extending shaft, but also simply a pinion gear.

These coupling means can be of any kind. According to an advantageous variant, these coupling means are selected from the group comprising at least one friction clutch, a pawl, and a pawl provided with a synchronizer.

A pawl provided with a synchronizer makes it possible to synchronise the respective speeds of the shafts before clutching, making it possible to manage the speed differential better than when there is no synchronizer.

Advantageously, these coupling means are designed to allow temporary sliding, during a preliminary coupling phase, between the shaft that is mechanically connected to said gas generator and the shaft that is mechanically connected to said free turbine.

Advantageously, a turboshaft engine according to the invention further comprises a device for spontaneously mechanically coupling said gas generator and said free turbine, which device is capable of mechanically and spontaneously connecting said gas generator and said free turbine as soon as the ratio of the rotational speed of said gas generator to the rotational speed of said free turbine reaches a predetermined threshold value. This threshold value for the ratio of the rotational speed of said gas generator to the rotational speed of said free turbine is in particular less than that which is obtained when the controlled coupling device is activated, such that, when the free turbine is rotating at its nominal speed while coupled to the rotor, the gas generator rotates no more than 10 to 20% faster than its rotational speed during idling flight.

A turboshaft engine according to another embodiment comprises a device for spontaneous mechanical coupling in addition to a device for controlled mechanical coupling when the gas generator reaches a threshold speed. Unlike for the controlled mechanical coupling device, the mechanical connection between the gas generator and the free turbine by means of the spontaneous mechanical coupling device does not depend on the rotational speed of the gas generator but on the ratio of the rotational speed of the gas generator to the rotational speed of the free turbine.

A turboshaft engine according to this variant of the invention thus makes it possible to force the free turbine to drive the gas generator when predetermined conditions are reached. In other words, a turboshaft engine according to the invention that is provided with a device for spontaneously mechanically coupling the gas generator and the free turbine makes it possible to automatically and spontaneously switch the turboshaft engine from the configuration referred to as free-turbine to the configuration referred to as connected-turbine, without an external assistance and/or control device. This switching from a free mode to a connected mode thus depends not only on the rotational speed of the gas generator, but also on the ratio of the rotational speed of the gas generator to the rotational speed of the free turbine.

Advantageously and according to this variant, said spontaneous mechanical coupling device is capable of mechanically and spontaneously connecting said gas generator and said free turbine as soon as the ratio of the speeds is less than said predetermined threshold value, and of spontaneously separating said gas generator and said free turbine as soon as said ratio is greater than said predetermined threshold value.

Advantageously, connected-turbine operation close to idling improves the transient performance, in particular in the event of a drop in the revolutions of the rotor during rapid pitching. This is because the gas generator then rotates at a speed that is greater than the speed required at zero power in free-turbine mode. The engine thus very rapidly produces a consequent power on the free turbine that corresponds to the value that the free-turbine turboshaft engine would have at this speed, plus the additional power resulting from rapidly reaching the acceleration limit, even before the gas turbine has started to accelerate.

Advantageously and according to this variant, said spontaneous mechanical coupling device comprises at least one free wheel which connects a first shaft which, together with said gas generator, has a reduction ratio K1, and a second shaft which, together with the free turbine, has a reduction ratio K2, said free wheel being arranged such that said free turbine spontaneously drives said gas generator, by means of said shafts and said free wheel, as soon as said ratio of the speeds is less than the ratio K2/K1.

Advantageously, a turboshaft engine according to this variant comprises a starter-generator that is rigidly connected to an intermediate shaft, and said spontaneous mechanical coupling device comprises two free wheels which connect said intermediate shaft to said first shaft which, together with said gas generator, has a reduction ratio K1, and to said second shaft, respectively, which second shaft, together with the free turbine, has a reduction ratio K2, said wheels being arranged such that said free turbine spontaneously drives said gas generator by means of said shafts and said free wheels as soon as the ratio of the speeds is less than the ratio K2/K1. Moreover, said starter-generator rigidly connected to the intermediate shaft is thus driven by the free turbine when said starter-generator is functioning as a generator, and said starter-generator drives the gas generator when said starter-generator is functioning as a starter.

The invention also relates to a twin-engine helicopter, characterised in that it comprises at least one turboshaft engine according to the invention.

The invention also relates to a method for optimising the zero-power super-idling mode of a twin-engine helicopter comprising at least one turboshaft engine comprising a gas generator that is capable of being rotated and a free turbine that is rotated by the gases of said gas generator, characterised in that it comprises a step of controlled mechanical coupling of said gas generator and said free turbine as soon as the rotational speed of said gas generator reaches a predetermined threshold speed.

Advantageously, a method according to the invention further comprises a step of spontaneously mechanically coupling said gas generator and the free turbine as soon as the ratio of the rotational speed of said gas generator to the rotational speed of said free turbine reaches a predetermined threshold value.

The invention also relates to a turboshaft engine, to a helicopter, and to a method for optimising the zero-power super-idling mode, characterised in combination by all or some of the features mentioned above or in the following.

5. LIST OF DRAWINGS

Figure 2:
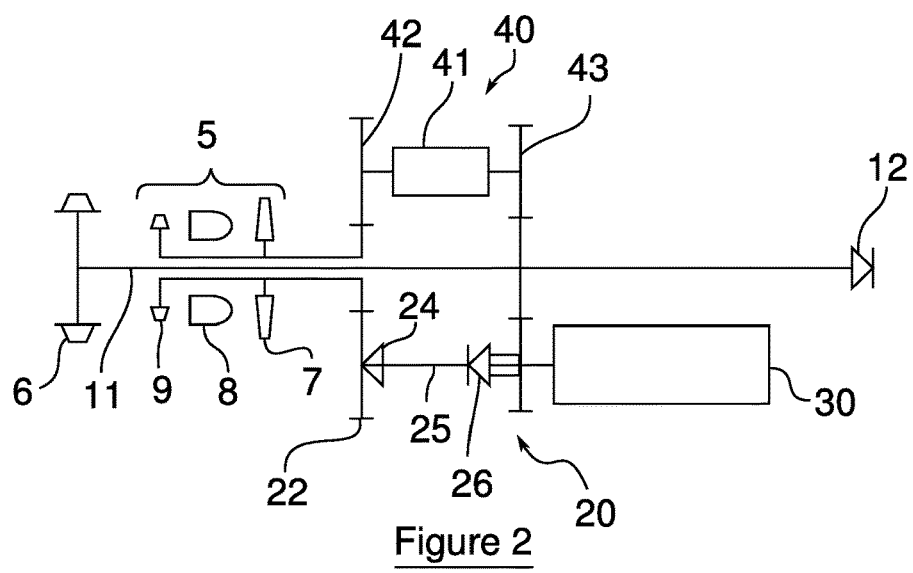
Figure 3:
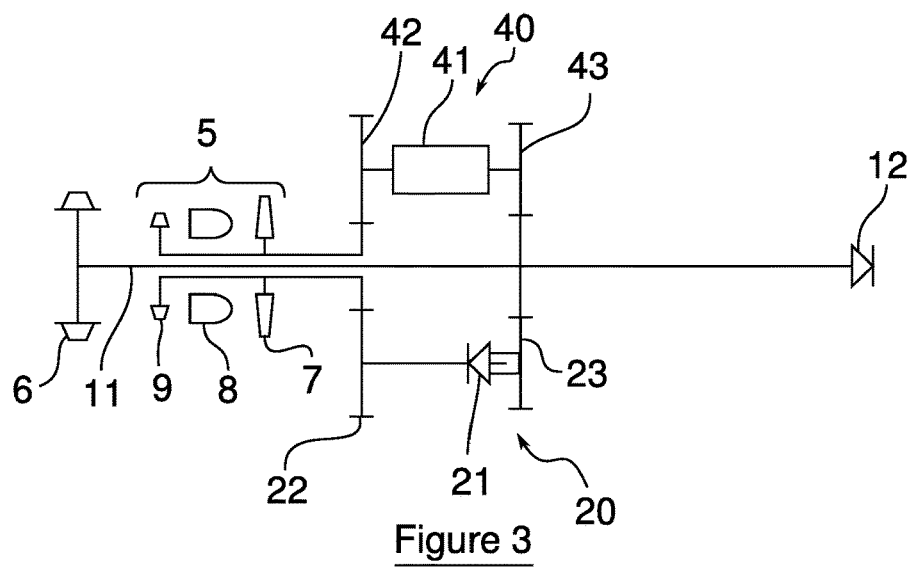

Other aims, features and advantages of the invention will emerge from reading the following description, which is given purely by way of non-limiting example and relates to the accompanying drawings, in which:

FIG. 1 is a schematic view of a turboshaft engine according to a first embodiment of the invention, FIG. 2 is a schematic view of a turboshaft engine according to a second embodiment of the invention, FIG. 3 is a schematic view of a turboshaft engine according to a third embodiment of the invention.

6. DETAILED DESCRIPTION OF AN EMBODIMENT OF THE INVENTION

As shown in the drawings, a turboshaft engine according to the invention comprises a gas generator 5 and a free turbine 6 that is powered by the gas generator 5. As is known, a gas generator 5 comprises at least one air compressor 7 that supplies a chamber 8 for combusting fuel in the compressed air and which supplies hot gases to at least one turbine 9 for partially expanding gas, which turbine rotates the compressor 7 by means of a drive shaft 10. The gases also drive the free power transmission turbine 6. This free turbine 6 comprises a power transmission shaft 11 that is connected to a power transmission gearbox (not shown in the drawings) by means of a free wheel 12. This free wheel 12 makes it possible to prevent mechanical locking of the turboshaft engine from causing mechanical locking of the power transmission gearbox and, by extension, of the rotor of the helicopter on which said turboshaft engine is mounted.

A turboshaft engine according to the invention further comprises a device 40 for controlled mechanical coupling of the gas generator 5 and the free turbine 6, which device is capable of connecting the gas generator 5 and the free turbine 6 mechanically and on demand as soon as the rotational speed NGG of the gas generator is less than a predetermined threshold speed. Throughout the text, the rotational speed NGG of the gas generator denotes the rotational speed of the drive shaft 10 of the gas generator. In the same way, the rotational speed NTL of the free turbine denotes the rotational speed of the drive shaft 11 of the free turbine.

This threshold speed is fixed at 30%.N1 for example, where N1 is the nominal rotational speed of the gas generator. In other words, the controlled mechanical coupling device 40 is capable of ensuring coupling between the gas generator and the free turbine when the turboshaft engine is in an idling mode. As soon as the rotational speed NGG of the gas generator is greater than the threshold speed, the gas generator and the free turbine are mechanically independent of one another.

According to the embodiment in the drawings, the control device 40 comprises a shaft 42 that is mechanically connected to the gas generator 5 and a shaft 43 that is mechanically connected to the free turbine. The control device 40 further comprises means for reading information that is representative of said rotational speed NGG of the gas generator 5. These reading means comprise, for example, a speed sensor that is mounted on the shaft of the gas generator 5, and therefore the information provided is a direct measurement of the speed of the gas generator 5. The control device further comprises means 41 for reversibly coupling the two shafts 42, 43 and means for controlling these coupling means 41.

According to an embodiment, the coupling means 41 comprise a friction clutch, such as a centrifugal clutch, a cone clutch, a single-disc clutch or a multiple-disc clutch. Coupling means of this kind have the advantage of allowing sliding between the shafts in a first coupling phase. According to an embodiment, the means for controlling this friction clutch are actuator-like hydraulic or electrical control means. Moreover, the control means comprise a module that is capable of receiving the measurement of the speed of the gas generator and of comparing said measurement with the threshold speed. A module of the kind is, for example, a software element, a sub-unit of a software program, or a hardware element, or a combination of a hardware element and a software subprogram.

According to another embodiment, the coupling means 41 comprise a pawl that is optionally equipped with a synchronizer for better managing the speed differential, making it possible to directly couple the shafts 42 and 43.

FIGS. 2 and 3 show two embodiments in which the turboshaft engine further comprises a device 20 for spontaneously mechanically coupling the gas generator 5 and the free turbine 6. This spontaneous mechanical coupling device 20 is capable of mechanically and spontaneously connecting the gas generator 5 and the free turbine 6 as soon as the ratio of the rotational speed of the shaft 10 of the gas generator 5 to the rotational speed of the shaft 11 of the free turbine 6 is less than a predetermined threshold value, and of spontaneously separating the gas generator 5 and the free turbine 6 as soon as the ratio is above this predetermined threshold value.

According to a first embodiment, and as shown in FIG. 3, this spontaneous mechanical coupling device 20 comprises a shaft 22 that is mechanically connected to the shaft 10 of the gas generator 5. Said shafts 22 and 10 have a reduction ratio between them of K1.

The spontaneous mechanical coupling device 20 further comprises a shaft 23 that is mechanically connected to the shaft 11 of the free turbine 6. Said shafts 23 and 11 have a reduction ratio between them of K2.

The spontaneous mechanical coupling device 20 further comprises a free wheel 21 that is arranged between the shafts 22 and 23.

Therefore, the rotational speed of the shaft 22 is equal to K1.NGG, where NGG is the rotational speed of the shaft 10 of the gas generator 5.

The rotational speed of the shaft 23 is equal to K2.NTL, where NTL is the rotational speed of the shaft 11 of the free turbine 6.

The free wheel 21 is oriented such that the shaft 23 can drive the shaft 22 by means of said free wheel 21.

If the rotational speed of the shaft 23 is less than the rotational speed of the shaft 22, the two shafts are independent. Otherwise, the two shafts are connected.

In other words, the shafts are independent if the following equation is complied with: K2.NTL<K1.NGG. The shafts are thus independent if the ratio NGG/NTL>K2/K1.

If the speed ratio is less than or equal to K2/K1, an engine torque is thus transmitted from the free turbine 6 to the gas generator 5.

In other words, the spontaneous mechanical coupling device 20 described in connection with FIG. 3 makes it possible to mechanically and spontaneously connect the gas generator 5 and the free turbine 6 when the ratio NGG/NTL is less than or equal to K2/K1, which ratio thus acts as a predetermined threshold value. The device also makes it possible to spontaneously separate the gas generator 5 and the free turbine 6 as soon as the ratio NGG/NTL exceeds K2/K1.

If the rotational speed NGG of the gas generator 5 is less than the threshold speed, the controlled mechanical coupling device 40 ensures that the gas generator 5 and the free turbine 6 are mechanically coupled by means of the coupling means 41. When this coupling has taken effect, the ratio NGG/NTL becomes significantly greater than K2/K1. The spontaneous mechanical coupling device 20 is therefore not active and the free wheel 21 slides. The two control devices 20, 40 are therefore entirely compatible with one another.

According to a second embodiment, and as shown in FIG. 2, the turboshaft engine further comprises a starter-generator 30. In this case, the coupling device comprises, in addition to the shafts 22 and 23 described in connection with FIG. 2, an intermediate shaft 25 that is rigidly connected to the starter-generator 30.

The coupling device 20 further comprises a first free wheel 26 that connects the intermediate shaft 25 to the shaft 23. Said device further comprises a second free wheel 24 that connects the intermediate shaft 25 to the shaft 22.

In the same way as for the embodiment of FIG. 3, the rotational speed of the shaft 22 is equal to K1.NGG, and the rotational speed of the shaft 23 is equal to K2.NTL.

The wheels 26, 24 are oriented such that the intermediate shaft 25 that is rigidly connected to the starter-generator 30 is capable of driving the shaft 22, and the shaft 23 is capable of driving the intermediate shaft 25 that is rigidly connected to the starter-generator 30.

The two free wheels 26, 24 drive simultaneously if the ratio NGG/NTL is equal to K2/K1.

If the ratio NGG/NTL is less than or equal to K2/K1, the shafts 10, 11 are thus mechanically connected and an engine torque is transmitted from the free turbine 6 to the gas generator 5.

If the ratio NGG/NTL is greater than K2/K1, the shafts are thus mechanically independent.

The starter-generator 30 is either driven by the free turbine (when functioning as a generator) or drives the gas generator (when functioning as a starter).

In other words, the mechanical spontaneous coupling device 20 described in connection with FIG. 2 also makes it possible to mechanically and spontaneously connect the gas generator 5 and the free turbine 6 when the ratio NGG/NTL is less than or equal to K2/K1. The device also makes it possible to spontaneously separate the gas generator 5 and the free turbine 6 as soon as the ratio NGG/NTL exceeds K2/K1. Furthermore, the generator and/or starter function is possible in this embodiment.

If the rotational speed NGG of the gas generator 5 is less than the threshold speed, the controlled mechanical coupling device 40 ensures that the gas generator 5 and the free turbine 6 are mechanically coupled by means of the coupling means 41. When this coupling has taken effect, the ratio NGG/NTL becomes significantly greater than K2/K1. The spontaneous mechanical coupling device 20 is therefore not active and at least one of the two free wheels 21, 26 slides. The two control devices 20, 40 are therefore entirely compatible with one another.

The invention also relates to a method for optimising the zero-power super-idling mode of a twin-engine helicopter comprising at least one turboshaft engine according to one of the embodiments described.

A method of this kind therefore comprises a step of mechanically coupling the gas generator 5 and the free turbine 6 as soon as the rotational speed NGG of the gas generator 5 is less than a predetermined threshold speed.

A method according to the invention is advantageously implemented by a turboshaft engine according to one of the embodiments described. A turboshaft engine according to one of the embodiments described advantageously implements a method according to the invention.

The invention claimed is:

1. A turboshaft engine comprising
a gas generator that is capable of being rotated,
a free turbine that is rotated by gases of said gas generator, and
a device for controlled mechanical coupling of said gas generator and said free turbine, which device is capable of connecting said gas generator and said free turbine mechanically and on demand as soon as a rotational speed of said gas generator reaches a predetermined threshold speed, wherein said device for controlled mechanical coupling of said gas generator and said free turbine is capable of connecting said gas generator and said free turbine mechanically and on demand as soon as said rotational speed of said gas generator is less than said predetermined threshold speed, and of separating said gas generator and said free turbine on demand as soon as said rotational speed of said gas generator is greater than said predetermined threshold speed, and wherein the turboshaft engine further comprises a device for spontaneously mechanically coupling said gas generator and said free turbine, which device is capable of mechanically and spontaneously connecting said gas generator and said free turbine as soon as a ratio of the rotational speed of said gas generator to the rotational speed of said free turbine reaches a predetermined threshold value.

2. The turboshaft engine according to claim 1, wherein said predetermined threshold speed depends on a nominal speed of said gas generator.

3. The turboshaft engine according to claim 2, wherein said predetermined threshold speed is selected within a range of [20%.N1, 60%.N1], where N1 is said nominal speed of said gas generator.

4. The turboshaft engine according to claim 1, wherein said device for controlled mechanical coupling of said gas generator and said free turbine comprises:
means for reading information that is representative of said rotational speed of said gas generator,
means for reversible mechanical coupling between a shaft that is mechanically connected to said gas generator and a shaft that is mechanically connected to said free turbine,
wherein said means for reversible mechanical coupling is controlled on the basis of said information that is representative of said rotational speed of said gas generator, and on the basis of said predetermined threshold speed.

5. The turboshaft engine according to claim 4, wherein said means for reversible mechanical coupling are selected from a group comprising at least one friction clutch, a pawl, and a pawl provided with a synchronizer.

6. The turboshaft engine according to claim 4, wherein said means for reversible mechanical coupling are designed to allow temporary sliding, during a preliminary coupling phase, between the shaft that is mechanically connected to said gas generator and the shaft hat is mechanically connected to said free turbine.

7. The turboshaft engine according to claim 1, wherein said device for spontaneously mechanically coupling said gas generator and said free turbine is capable of mechanically and spontaneously connecting said gas generator and said free turbine as soon as the ratio of the speeds is less than said predetermined threshold value, and of spontaneously separating said gas generator and said free turbine as soon as said ratio is greater than said predetermined threshold value.

8. The turboshaft engine according to claim 1, wherein said device for spontaneously mechanically coupling said gas generator and said free turbine comprises at least one free wheel which connects a first shaft which, together with said gas generator, has a reduction ratio K1, and a second shaft which, together with the free turbine, has a reduction ratio K2, said free wheel being arranged such that said free turbine spontaneously drives said gas generator, by means of said first and second shafts and said free wheel, as soon as said ratio of the speeds is less than a ratio K2/K1.

9. The turboshaft engine according to claim 8, wherein it comprises a starter-generator that is rigidly connected to an intermediate shaft, and in that said spontaneous mechanical coupling device comprises two free wheels which connect said intermediate shaft to said first shaft, which, together with said gas generator, has the reduction ratio K1, and to said second shaft, respectively, which second shaft, together with the free turbine, has the reduction ratio K2, said wheels being arranged such that said free turbine spontaneously drives said gas generator by means of said shafts and said two free wheels when said ratio of the speeds is less than the ratio K2/K1.

10. A twin-engine helicopter, wherein the twin engine helicopter comprises at least one turboshaft engine according to claim 1.

11. A method for optimising a zero-power super-idling mode of a twin-engine helicopter comprising at least one turboshaft engine comprising a gas generator that is capable of being rotated and a free turbine that is rotated by gases of said gas generator, wherein the method comprises a step of controlled mechanical coupling of said gas generator and said free turbine as soon as a rotational speed of said gas generator reaches a predetermined threshold speed, and a step of spontaneously mechanically coupling said gas generator and the free turbine as soon as a ratio of the rotational speed of said gas generator to the rotational speed of said free turbine reaches a predetermined threshold value.

* * * * *